United States Patent [19]
Leyde et al.

[11] 3,742,434
[45] June 26, 1973

[54] AUTOMATIC DOOR-OPENING SYSTEM USING AN ACOUSTIC OBJECT DETECTION SYSTEM

[75] Inventors: Warren L. Leyde; Delbert E. Marker, both of Seattle, Wash.

[73] Assignee: Republic Industries, Inc., Chicago, Ill.

[22] Filed: Sept. 30, 1971

[21] Appl. No.: 185,073

[52] U.S. Cl. .......................... 340/1 R, 49/25, 49/31, 340/16 C
[51] Int. Cl. ............................................. G01s 9/66
[58] Field of Search ................... 49/25, 31; 340/1 R, 340/261, 1 T, 16 C

[56] References Cited
UNITED STATES PATENTS

| | | | |
|---|---|---|---|
| 3,474,400 | 10/1969 | Auer et al. | 340/1 R |
| 1,929,273 | 10/1933 | Crago | 49/25 |
| 3,373,526 | 3/1968 | Parkin | 340/16 C |
| 3,176,266 | 3/1965 | Auer, Jr. | 340/1 R |

Primary Examiner—Richard A. Farley
Attorney—Christensen & Sanborn

[57] ABSTRACT

An object detection system is disclosed which makes use of an acoustic transducer for generating compressional waves in the air and detecting return pulses from an object lying within the detection zone. A transducer mounting system includes a transducer slug mounted for generating acoustic waves from both ends of the slug. The antenna system includes a reflector housing adapted to accommodate variable surfaces for controlling the energy pattern. Details of the electronic circuitry associated with the transducer mounting system and a door opening system are disclosed.

7 Claims, 11 Drawing Figures

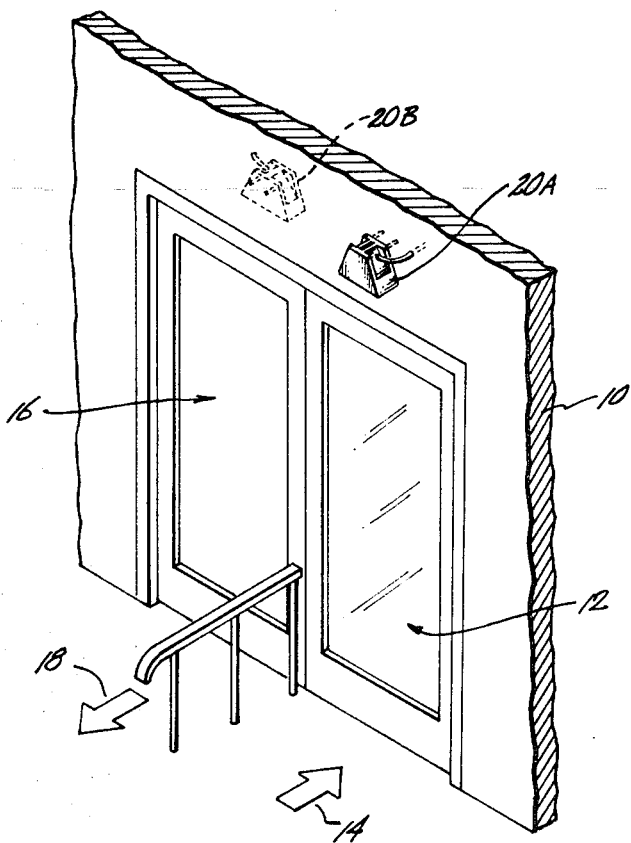
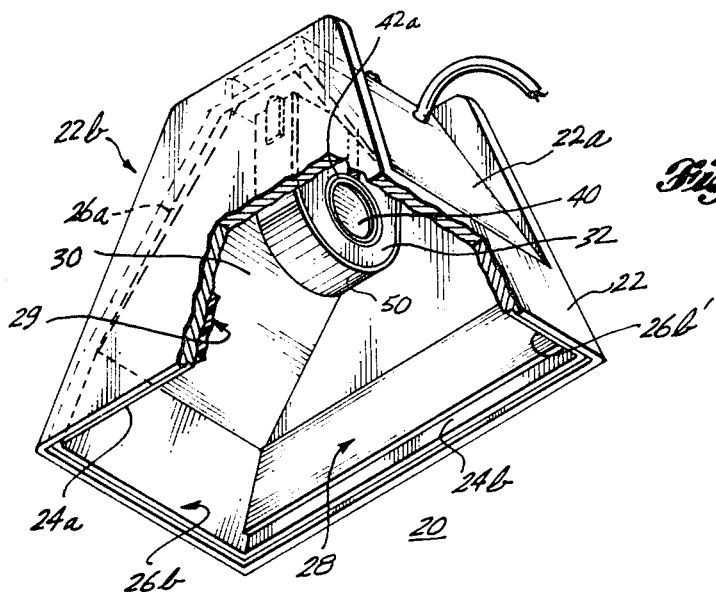

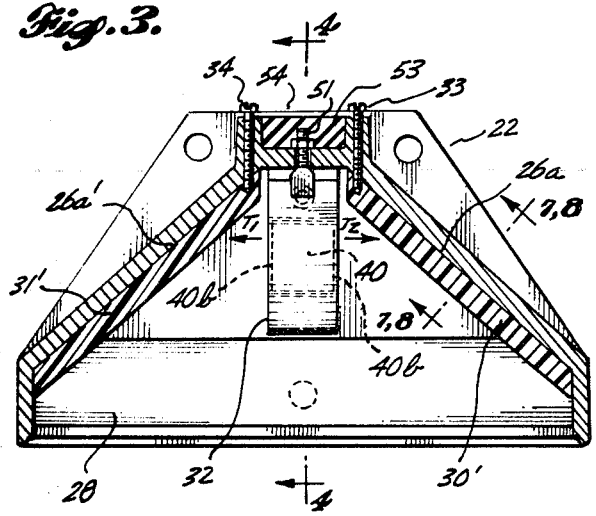
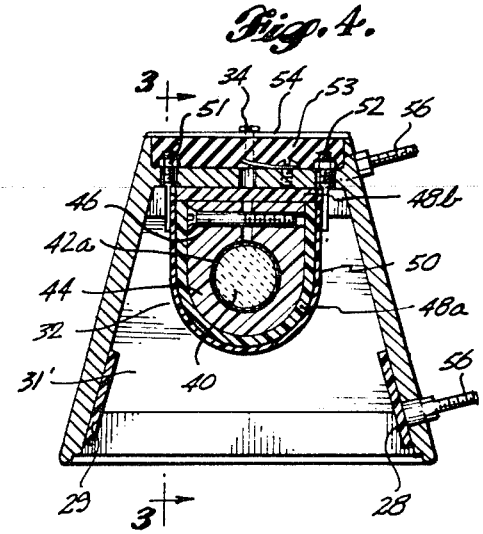
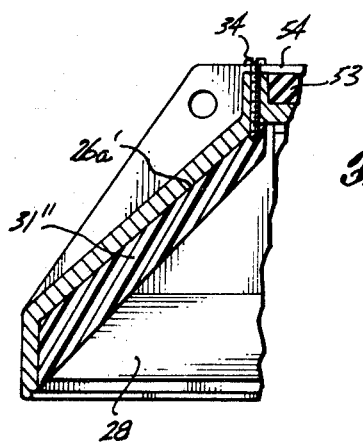
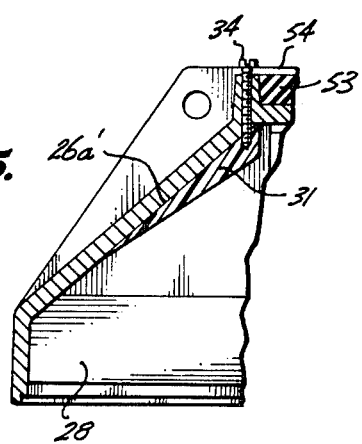
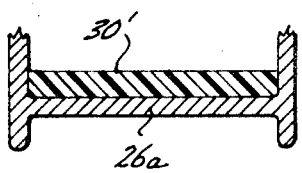
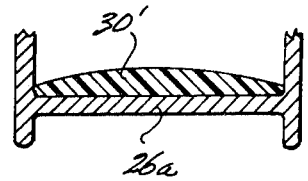

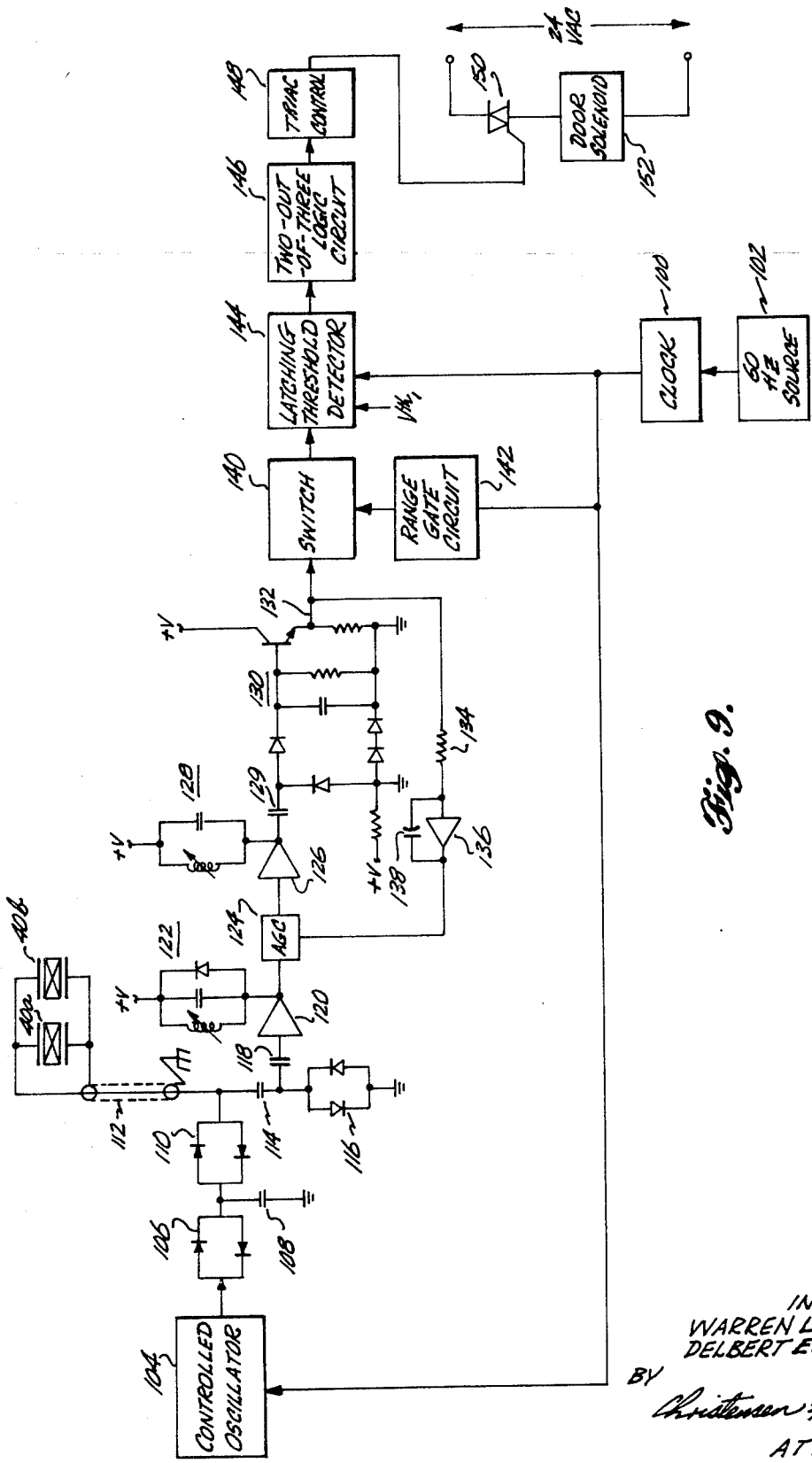

INVENTORS
WARREN L. LEYDE
DELBERT E. MARKER

BY Christenson & Sanborn
ATTORNEYS

AUTOMATIC DOOR-OPENING SYSTEM USING AN ACOUSTIC OBJECT DETECTION SYSTEM

FIELD OF THE INVENTION

This invention relates to control systems for the opening and closing of doors, and, more particularly, to such systems detecting the presence of objects within the vicinity of the door by use of an acoustic object detection system.

BACKGROUND OF THE INVENTION

Object detection systems of the acoustic pulse-echo type have been known and used for some time, especially in traffic detection and control systems. Generally, such systems include a source of ultrasonic energy, an ultrasonic transducer coupled to the source for emitting a narrow pulse or series of pulses of ultrasonic energy, a second ultrasonic transducer for receiving return pulses from objects within a predetermined detection zone, and a detection circuit coupled to the ultrasonic transducer for providing an output signal when a predetermined criterion is met by return pulses.

The present invention comprises an improvement in systems of this type which has particular applicability to door-opening and closing systems, whether used indoors or outdoors.

It is another object of this invention to provide an acoustic object detection system which is particularly reliable in outdoor applications.

It is a further object of this invention to provide such an object detection system which includes the capability to distinguish between valid pulse returns and invalid pulse returns, such as might be caused by ground, wall, and precipitation surfaces.

It is yet another object of this invention to provide an object detection system which is particularly adaptable to the automatic opening and closing of doors.

It is still another object of this invention to provide an antenna system for an object detection system wherein means are provided to minimize unwanted pulse returns from the antenna system itself.

It is yet a further object of this invention to provide an antenna system for an object detection system in which control readily can be made of the beam pattern thereof.

SUMMARY OF THE INVENTION

These objects and others are achieved, briefly, by providing a system including an ultrasonic transducer means transmitting a pulse or pulses of ultrasonic energy within a detection zone immediately adjacent a door to be controlled, means receiving acoustic signals including return pulses from objects within the detection zone, a logic circuit comparing said acoustic signals with a predetermined criterion of said return pulses to be expected when an object is within the detection zone of the system, and means responsive to the operation of said logic circuit for controlling the operation of said doors.

BRIEF DESCRIPTION OF THE DRAWINGS

The invention can perhaps best be understood by reference to the following portion of the specification, taken in conjunction with the accompanying drawings in which:

FIG. 1 is a pictorial view showing a typical installation of two antenna systems for permitting bidirectional control of a door or doors;

FIG. 2 is a cut-away, pictorial view of one embodiment of the antenna system of this invention;

FIG. 3 is a back, sectional view of the antenna system of FIG. 2;

FIG. 4 is a side, sectional view of the antenna system of FIG. 2;

FIGS. 5 and 6 are additional back-sectional views of the antenna system showing alternate embodiments of the side inserts shown in FIG. 3;

FIGS. 7 and 8 are cross-sectional views of additional alternate embodiments of these side inserts;

FIG. 9 is a block diagram of the electronic circuitry of the object detection system;

DESCRIPTION OF A PREFERRED EMBODIMENT

Figure 10:
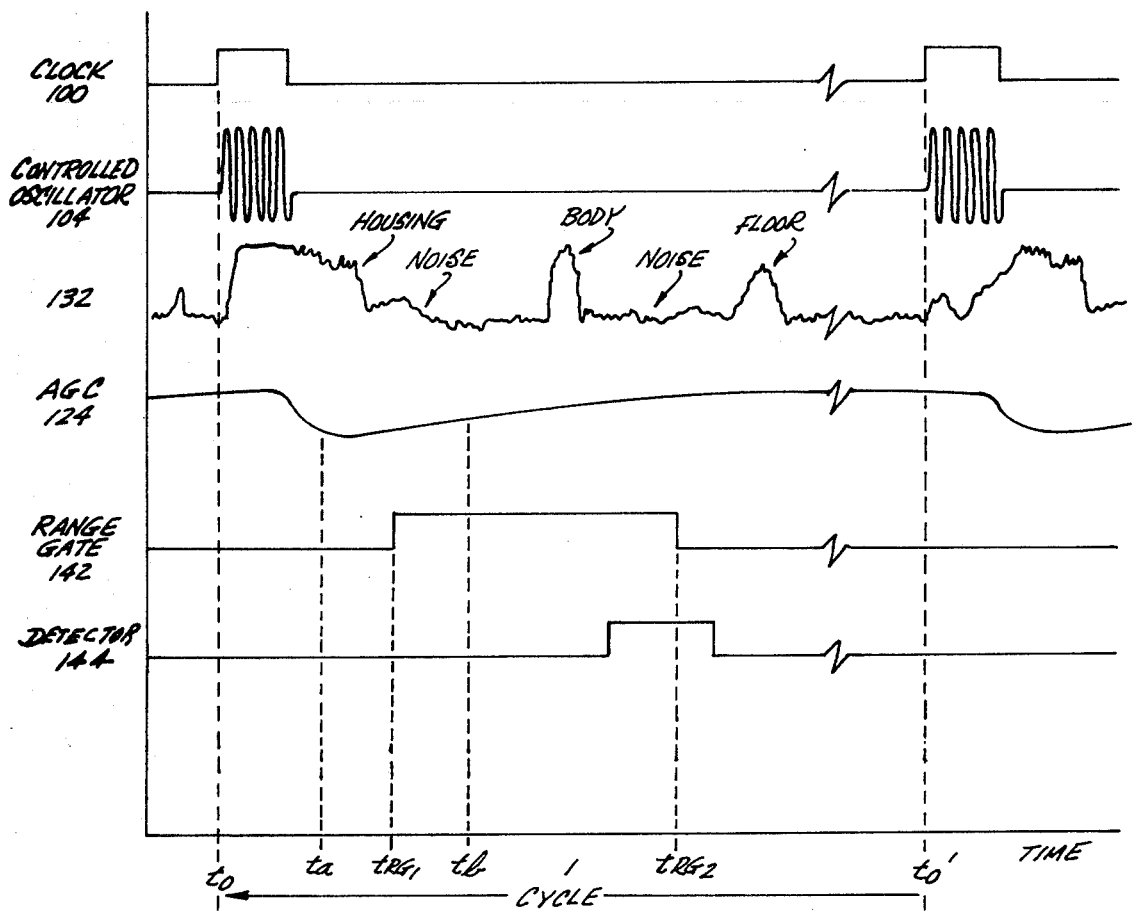
FIG. 10 is a timing diagram illustrating a typical cycle of operation thereof.
Figure 11:
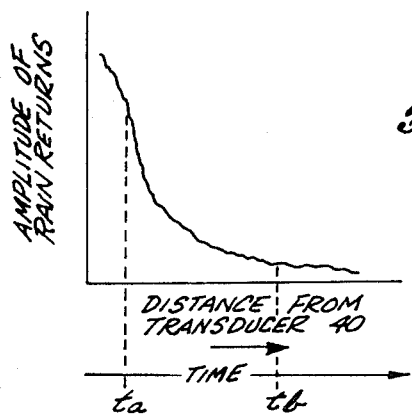
FIG. 11 is a graph illustrating a relationship between return pulses from precipitation and distance thereof from a transmitting transducer.

With reference now to FIG. 1, a wall surface 10 includes doors 12 and 16. Passage through the door 12 is made in the direction of an arrow 14 and is controlled by a first acoustic object detection system including an antenna system 20A positioned on wall 10 so as to sense the presence of individuals desiring to pass in the direction 14. similarly, passage through the door 16 in the direction of an arrow 18 is controlled by a second acoustic object detection system including an antenna system 20B located on wall 10 so as to sense the presence of individuals desiring to pass in the direction 18.

It can be readily appreciated that acoustic object detection systems encounter many difficulties in applications such as illustrated in FIG. 1. For example, false return pulses can be provided by the reflector housing of the antenna system, by the wall surface 10, by either of the doors 12 or 16, by the floor, railings and other adjacent objects, and so forth. If the acoustic object detection system is used outdoors, false return pulses can also be obtained from the surfaces of precipitation.

Therefore, the system must compensate for false returns to the extent that they do not mask desired returns from individuals or other objects within a predetermined detection zone. The embodiment of the antenna system illustrated in FIGS. 2–4 minimizes ringing of the reflector housing thereof and additionally allows variable control of the antenna's beam pattern so as to sharply define the desired detection zone, thereby further reducing false returns.

In more detail, the antenna system includes a reflector housing 22 of metallic material which preferably has a rough finish on all surfaces thereof. In one embodiment, the material comprised an aluminum alloy. The upper end of the reflector housing 22 is closed and the sides thereof are flared therefrom to define an interior cavity. The lower ends of the housing sides additionally define a substantially rectangular aperture for the transmission and reception of ultrasonic pulses. The narrower sides of the reflector housing 22 include recessed portions 22a, 22b which are flared at a greater angle than are the corresponding sides.

As a result, the interior cavity of the housing 22 is defined by left and right, gradually-tapered surfaces 26b, 26b', by adjoining sharply-tapered surfaces 26a 26a', and by front and back, gradually-tapered surfaces 24a, and 24b. Energy absorbing inserts 28, 29 are affixed to surfaces 24b and 24a, and beam-directing inserts 30, 31 are affixed to surfaces 26a, 26a'. A transducer assembly 32 extends downwardly into the cavity and is supported in a manner to be described in more detail hereinafter.

With particular reference now to FIGS. 3-4, the reflector housing 22 is shown in back-sectional and side-sectional views, respectively. In these views, the beam-directing inserts 30, 31 have been replaced by longer embodiments thereof, 30', 31', but otherwise the device is identical to that shown in FIG. 2. The transducer assembly 32 includes a ceramic slug 40 having left and right end surfaces 40a, 40b, respectively. In a practical embodiment, a lead zirconate ceramic was used. As can be seen, ceramic slug 40 is mounted in such a manner by the transducer assembly 32 so that transmission occurs simultaneously in opposite directions T1, T2. By this arrangement, the necessity for an energy-absorbing means at one end of the ceramic slug is eliminated. In addition, the power output of the transducer is practically doubled by virtue of the increased radiating surface.

Since the ultrasonic radiation occurs substantially in a direction normal to the plane of the surfaces 40a, 40b, it first comes into contact with the beam-directing inserts 31', 30'. The surface configuration of these inserts and their relative orientation with respect to the directions T1, T2, largely determine the beam pattern of the antenna system. Therefore, choice of these inserts allows control of the system's detection zone. Additional embodiments 31" and 31 are shown in FIGS. 5 and 6, respectively.

As noted in FIGS. 7 and 8, the configuration of the beam-directing inserts may also be varied in cross-section so as to vary the relative strength of the beam in planes parallel to the surfaces 40a, 40b of the ceramic slug 40.

The beam-directing inserts are preferably composed of a plastic material having a smooth surface presented to the interior cavity. In assembly, the beam-directing inserts are positioned within the cavity adjacent inner surfaces 26a, 26a'. Fine tuning is then accomplished by adjustment of fasteners 33, 34, which are threaded through corresponding apertures in housing 22 into each beam-directing insert. When tuning is accomplsihed, the inserts are then maintained in place by an adhesive.

As will be readily recognized by those skilled in the art, the beam-directing inserts function in a similar manner to direct returns of the transmitted pulses back to the surfaces 40a, 40b.

In order to minimize ringing of the antenna system itself, the design thereof must compensate for the fact that ceramic slugs commonly used have a narrow bandwidth and a high Q. The application of an ultrasonic pulse thereto causes an oxcillation therein which, if left undamped, would persist for a time sufficient to mask some returns from desired objects within the detection area. In addition, returns arising from pulse transmission from the ceramic slug 40 through the transducer arrangement 32 to the housing 22 and back must be minimized, as must those pulses returning through the air from the housing 22.

In order to damp the slug oscillations, the sluh 40 is wrapped with an inner layer 42a of neoprene, and an outer layer 42b of corprene. Layer 42a functions primarily to dampen the slug oscillations, whereas layer 42b functions primarily to isolate these oscillations from the housing 22. In order to achieve the proper amount of damping, the slug 40 is clamped by a nylon clamp 44. The circumferential compression force exerted on slug 40, and thus the amount of damping, is adjusted by means of a fastener 46 passing through both legs of clamp 44. In order to complete the isolation of the slug 40 from the housing 22, the clamp 44 is in turn covered with separate portions 48a, 48b, of corprene. This assembly is then secured to the housing 22 by at least one nylon strap 50 whose ends terminate in adjustable tensioning fasteners 51, 52 mounted in the upper surface of housing 22. Electrical connections are made from the ceramic slug 40 to appropriate terminal points in a cavity 53 and connections thereafter made to the remainder of the system by a cable not illustrated. The cavity 53 may be filled with a suitable potting compound and enclosed by a cover plate 54.

To minimize ringing of the housing 22 itself, the energy absorbing inserts 28 and 29 are provided. Preferably, these inserts are composed of a plastic material having a relatively rough finish and are secured to the inner surfaces 24b, 24a, by a suitable adhesive.

The antenna system including reflector housing 22 is mounted to an appropriate fixed surface, such as wall 10 in FIG. 1, by a splurality of nylon fasteners 56 which serve to electrically isolate the mounting surface and the housing 22 so as to further minimize false returns.

Electronic circuitry of the acoustic object detection system suitable for use in a door opening system is seen in FIG. 9. Reference should also be made throughout the ensuing discussion to the timing diagram of FIG. 10. In the embodiment of FIG. 9, timing pulses are provided by a clock source 100. For example, these pulses may be derived from a commonly-available 60 Hz source 102 and comprise pulses having a width of one millisecond which occur at a repetition rate of 15 Hz. To avoid interference between adjacent systems, the clock pulses in one system may be phase-shifted from those in a second system.

The clock pulses from clock source 100 are applied in turn to a controlled oscillator 104, to a range gate circuit 142, and to a latching threshold detector 144. Controlled oscillator 104 comprises a standard oscillator and driver stage operable to provide an output pulse of electrical energy in the ultrasonic frequency range for the duration of the input clock pulse thereto. In a practical embodiment, the frequency of oscillator 104 was 75 KHz.

The pulse of electrical energy in the ultrasonic frequency range is applied through a first portion of a duplex circuit including a first pair of reverse-parallel diodes 106, capacitor 108, a second pair of reverse-parallel diodes 110, and a shielded, RF cable 112 to ceramic slug 40. The transmitting pulse is blocked from the remainder of the electronic circuitry by a second portion of the duplex circuit including a capacitor 114 and a third pair of reverse-parallel diodes 116, both of which are coupled from the common junction of the signal lead of RF cable 112 and diodes 110 to a source of reference potential.

Shortly after the termination of the transmitting pulse, return pulses are detected by the ceramic slug 40 and coupled by RF cable 112 to the common junction of the duplex circuit. At this time, the duplex circuit acts to couple signals corresponding to the return pulses directly to the input of an amplifier 120 through capacitor 114 and a capacitor 118.

The return pulses generally comprise four types. First, return pulses from the reflector housing 22 and its elements. These ringing pulses cannot be eliminated because of the proximity of the housing 22 to the ceramic slug 40, but can be minimized and controlled by use of the antenna design previously discussed. In most cases, the ringing pulse from the housing 22 will have a longer duration than that of the transmitting pulse of ultrasonic energy, due to ringing of the housing. Second, return pulses from the body of any individual within the detection zone. These pulses will arrive at the ceramic slug 40 at some time after the first or "housing" return pulse because of the corresponding greater distance between the individual and the slug 40. These pulses will be formed by reflections from the head and shoulder surfaces, then other, lower surfaces of the body and will comprise a relatively high-amplitude, short-duration pulse. In a door-opening system, these return pulses represent the desired object to be detected. The relative time occurrence of these return pulses will vary with respect to that of the transmitting pulse of ultrasonic energy, due to differences in the height and physical characteristics of individuals. Other objects within the detection zone will also cause large return pulses in this time period.

Third, a return pulse corresponding to a reflection from the floor. This return pulse will arrive after the "housing" and "body" return pulses. The relative time occurrence of this pulse with respect to the pulse of ultrasonic energy is substantially constant.

Fourth, miscellaneous pulses, which may be characterized as noise. As such, they may comprise either reflections of the transmitted pulse from the ceramic slug 40, or signals arising from other sources within or without the detection zone. A special case of noise comprises those reflections from precipitation, such as from rain droplets.

Noise signals having a different frequency than that of oscillator 104 are discriminated against by tuning amplifier 120 by a circuit 122 connected from the voltage source $V_s$ to the output terminal thereof. The output signal is then coupled through an automatic gain circuit 124 and a second amplifier 126, which is tuned by a second circuit 128, and a capacitor 129 to the input of a rectifying and level-shifting circuit 130. The signal occurring on the output terminal 132 of circuit 130, comprises a rectified version of the four types of return pulses heretofore mentioned.

Because the "noise" return pulses are random, they must be normalized prior to further signal treatment. Therefore, the system includes a feedback connection from terminal 132 to the control input of automatic gain control circuit 124 which comprises an integrator including a series-connected resistor 134 and operational amplifier 136, and a capacitor 138 connected in feedback around operational amplifier 136.

The combination of the integrator in the feedback connection and the automatic gain control circuit 124 functions as a noise automatic gain control and as a sensitivity time control. First, the integrator is designed to have a time constant longer than the expected duration of the "body" return pulses. In this manner, signals corresponding to these return pulses do not affect the operation of the automatic gain control. Second, as the "noise" return pulses are generally continuous, the combination averages out long-term differences therein so as to hold the envelope of the "noise" return pulses at a substantially constant level.

Third, the combination serves to discriminate against "rain" return pulses in a unique manner. With particular reference now back to FIG. 10, a signal corresponding to the "housing" return pulse acts to substantially lower the gain of the system at time $T_a$, inasmuch as the "housing" return pulse is of extended duration greater than the time constant of the integrator and inasmuch as the magnitude thereof is relatively large. The gain gradually increases thereafter. With particular reference now to FIG. 1, it has been found that the amplitude of the "rain" return pulses diminishes as the inverse of the distance of the droplets from the ceramic slug 40. Therefore, the magnitude of the "rain" return pulses is greatest for droplets immediately adjacent the housing 22. However, it is at this distance, or at the corresponding time $t_a$, that the attenuation of the automatic gain control circuit 124, in response to the large "housing" return pulse, is greatest. At time $t_b$, the returns are much weaker but the gain of the system has been increased. Therefore, the "rain" return pulses are also averaged so that the resultant noise signal is substantially equivalent to the average "noise" return pulses.

Therefore, the signals on terminal 132 which correspond to the four types of return pulses, as modified, appear as shown in FIG. 10. These signals are applied to the input of a normally-open switch circuit 140 whose output is coupled to the latching threshold detector 144 and which is controlled by the range gate circuit 142. The control signal from range gate circuit 142 is seen in FIG. 10 and begins at a first predetermined time $t_{RG1}$ after the production at $t_0$ of the clock pulse from clock source 100 and terminates at a second predetermined time $t_{RG2}$ thereafter. The times $t_{RG1}$, $t_{RG2}$ are chosen to block signals corresponding to the "housing" and "floor" return pulses.

The latching threshold detector 144 is normally reset at the beginning to each cycle of operation by the clock pulse from clock source 100. In this first state, latching threshold detector provides no output signal. However, when range gate circuit 142 has opened switch 140, latching threshold detector 144 is triggered into its second state when the magnitude of the signal presented thereto exceeds a threshold value $V_{th1}$. The valve of $V_{th1}$ is chosen to be greater than the average value of the signals corresponding to the "noise" and "rain" return pulses. Therefore, latching threshold detector 144 blocks noise signals from its output for a certain period of time. If an individual or other object is not within the detection zone, no "body" return pulse is provided and therefore latching threshold detector 140 remains in its first state so that no output signal is provided throughout the time that switch 140 is opened by the range gate circuit 142.

However, if latching threshold detector 144 is placed into its second state by a large return pulse, the signals are coupled to the input of a two-out-of-three logic circuit 146. The choice of a two-out-of-three logic circuit is predicated on the assumption that an individual or other object within the detection zone will create at least two relatively-large amplitude return pulses exceeding the threshold level $V_{th1}$ during successive cycles determined by the clock pulses.

Therefore, logic circuit 146 comprises a counter which furnishes an output signal for a predetermined period of time when return pulses are detected during the range gate period for two out of three successive cycles. This output signal is applied to a Triac control circuit 148 which is of a standard configuration. In response, Triac control 148 provides a control signal to the gate electrode of a Triac 150 which is connected in series with a door solenoid 152 across a suitable alternating current voltage source. The time period of conduction of Triac 150, after passage of an individual is, on the order of one second, so as to hold the door open to allow passage of the individual therethrough and so as to prevent oscillation of the door in response to secondary detections of the individual within the detection zone at the next and succeeding clock pulses from clock pulse source 100.

While the invention has thus been described in terms of the preferred embodiment, it is to be fully understood by those skilled in the art that the invention is not limited thereto, but rather is intended to be bounded only by the limits of the appended claims.

What is claimed is:

1. A system for automatically controlling the operation of one or more doors, comprising an ultrasonic transducer means for transmitting and receiving ultrasonic waves within a predetermined detection zone, means supporting said transducer means in proximity to a door so that individuals desiring to pass through said door first enter said detection zone, clock means developing relatively low frequency clock pulses, an ultrasonic source controlled by said clock means to produce a burst of ultrasonic energy for each of said clock pulses, means coupling said source to said transducer, a detection circuit also coupled to said transducer and providing an output signal representing pulse returns from objects within said detection zone, said detection circuit comprising an amplifier, an automatic gain control circuit regulating the gain of said detection circuit and an integrating means coupled to the output of said detection circuit for controlling said automatic gain control circuit in response to the magnitude of said output signal, the time constant of said integrating means being chosen to be longer than the expected duration of return pulses from individuals within said detection zone, means coupled to said output signal for discriminating against false pulse returns, said disciminating means providing a control signal only when said returns are characteristic of an object within said detection zone, and means controlling the opening or closing of said door in response to said control signal.

2. A door-controlling system as recited in claim 1, wherein said discriminating means includes a normally-opened switch having said output signal connected thereto, a range gate circuit controlled by said clock pulses closing said switch for a predetermined time period subsequent to each of said clock pulses to thereby block close-in and floor return pulses, a logic circuit having connected thereto the output of said switch, and a source of a threshold signal coupled to said logic circuit, said logic circuit being operative to provide said control signal only if said output signal exceeds said threshold signal on two out of three successive cycles determined by said clock pulses.

3. A door-controlling system as recited in claim 1, wherein said detection circuit comprises means regulating the components of said output signal corresponding to noise at a predetermined, substantially constant level, and wherein said discriminating means includes a source of a threshold signal, the magnitude thereof being greater than that of the regulated noise components in said output signal, and a threshold detector coupled to said threshold signal source which is normally operative to inhibit said output signal except when the level thereof exceeds that of said source.

4. A door-controlling system as recited in claim 1, wherein said control means comprises an electrical door actuator, a source of power, a control device in circuit with said source and said actuator, and means energizing said control device for a relatively long period of time in response to said control signal.

5. A door-controlling system as recited in claim 4, wherein said control device comprises a bidirectional controllable semiconductor.

6. A door-controlling system as recited in claim 1, wherein said ultrasonic transducer means comprises a reflector housing defining an interior cavity and an aperture for the passage of ultrasonic waves, and a single transducer slug supported within said cavity.

7. A door-controlling system as recited in claim 1, wherein said ultrasonic energy has a frequency of 75 kHz and said clock source has a frequency of 15 Hz.

* * * * *